(12) United States Patent
Rieger

(10) Patent No.: US 9,395,230 B2
(45) Date of Patent: Jul. 19, 2016

(54) FILL LEVEL MEASUREMENT SYSTEM AND METHOD FOR DETERMINING A FILL LEVEL

(71) Applicant: AIRBUS OPERATIONS GMBH, Hamburg (DE)

(72) Inventor: Ulrich Rieger, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 261 days.

(21) Appl. No.: 14/089,131

(22) Filed: Nov. 25, 2013

(65) Prior Publication Data

US 2014/0150549 A1      Jun. 5, 2014

Related U.S. Application Data

(60) Provisional application No. 61/730,556, filed on Nov. 28, 2012.

(30) Foreign Application Priority Data

Nov. 28, 2012   (EP) ..................................... 12194666

(51) Int. Cl.
*G01F 23/296*    (2006.01)
*G01F 23/64*     (2006.01)

(52) U.S. Cl.
CPC .......... *G01F 23/296* (2013.01); *G01F 23/2962* (2013.01); *G01F 23/64* (2013.01)

(58) Field of Classification Search
CPC .... G01F 23/296; G01F 23/64; G01F 23/2962
USPC .................................................. 73/306, 291
See application file for complete search history.

(56) References Cited

U.S. PATENT DOCUMENTS 4,210,969 A * 7/1980 Massa ................. G01S 7/52004
                                                      367/108
5,184,510 A    2/1993 Rossman
(Continued)

FOREIGN PATENT DOCUMENTS

DE        103 54 473        6/2005
DE     10 2005 035 846      2/2007
(Continued)

OTHER PUBLICATIONS

European Search Report for Application No. EP 12 19 4666 dated May 17, 2013.

*Primary Examiner* — Hezron E Williams
*Assistant Examiner* — Marrit Eyassu
(74) *Attorney, Agent, or Firm* — Jenkins, Wilson, Taylor & Hunt, P.A.

(57) ABSTRACT

A measurement system for determining a liquid fill level of a tank, including a floating sensor configured to float on the surface of a liquid contained in the tank, at least three reference sensors mounted at a hull of the tank in a spatially fixed arrangement, and a control device to control the floating sensor and the reference sensors, wherein at least one of the floating sensor and the reference sensors can emit an acoustic signal to the remaining sensors, wherein the remaining sensors can receive the emitted acoustic signal, and wherein the control device is configured to determine signal travelling times of the acoustic signal from the emitting sensor to the receiving sensor, to compute a spatial position of the floating sensor with respect to the reference sensors from the signal travelling times, and to determine the liquid fill level using the computed spatial position of the floating sensor.

14 Claims, 2 Drawing Sheets

(56) References Cited

U.S. PATENT DOCUMENTS

| | | | | |
|---|---|---|---|---|
| 5,263,371 A | * | 11/1993 | Maresca, Jr. | G01F 23/2962 181/124 |
| 6,427,532 B1 | | 8/2002 | Keller | |
| 6,629,457 B1 | * | 10/2003 | Keller | F02D 33/003 367/908 |
| 7,421,895 B1 | * | 9/2008 | Caldwell | G01F 23/2962 73/290 V |
| 2007/0028684 A1 | * | 2/2007 | Benz | G01F 23/284 73/314 |
| 2009/0158840 A1 | * | 6/2009 | Watt | G01F 23/64 73/291 |
| 2010/0128569 A1 | * | 5/2010 | Tran | G01F 1/002 367/99 |

FOREIGN PATENT DOCUMENTS

| | | |
|---|---|---|
| DE | 10 2008 017 070 | 10/2009 |
| WO | WO 2007/014703 | 2/2007 |
| WO | WO 2009/000283 | 12/2008 |

* cited by examiner

FILL LEVEL MEASUREMENT SYSTEM AND METHOD FOR DETERMINING A FILL LEVEL

CROSS-REFERENCES TO RELATED APPLICATIONS

This application claims the benefit of and priority to U.S. Provisional Application No. 61/730,556, filed Nov. 28, 2012, and European patent application No. 12 194 666.9, filed Nov. 28, 2012, the entire disclosures of which are incorporated herein by reference.

TECHNICAL FIELD

The present invention pertains to a fill level measurement system and a method for determining of fill levels, in particular of fill levels of liquids in tanks of aircraft or spacecraft.

BACKGROUND

The document U.S. Pat. No. 5,184,510 A discloses an apparatus and a method for measuring the level of a liquid within a storage tank, including a target for being buoyantly supported near the surface of the liquid and an acoustic sensor for measuring the distance between a tank reference point and the target.

The document U.S. Pat. No. 6,427,532 A discloses a device for measuring a fill level of a liquid includes an ultrasonic sensor with two sensor elements. One of the sensor elements determines the echo time of an ultrasonic wave to a float which follows the liquid level. The other of the sensor elements determines the echo time of the ultrasonic wave up to a measuring reflector arranged at a known distance from the other of the sensor elements. An evaluation unit compares the echo times and determines the fill level of the liquid from the ratio of echo times and from the known distance to the measuring reflector.

The document DE 10 2005 035 846 A1 discloses a device for measuring a fill level comprising a receiving unit floating on a surface of a liquid which uses distance measurement based on signals emitted by an emitting unit to measure the distance between the emitting and receiving unit to determine the fill level.

Measurement of fill levels of liquids in containers, tanks, vessels or other reservoirs containing liquids in aircraft or spacecraft poses certain challenges due to the generally adverse environmental conditions. In waste tanks, potable water tanks or fuel tanks the amount of contained liquids and possibly other objects has to be determined under variable cabin and ambient pressure.

SUMMARY

It is therefore one idea of the present invention to provide for measurement systems and procedures to determine the fill level of a liquid in a tank which are reliable, easy to implement and adaptive to varying environmental conditions.

According to a first aspect of the present invention, a measurement system for determining a liquid fill level of a tank comprises a floating sensor configured to float on the surface of a liquid contained in the tank, at least three reference sensors mounted at a hull of the tank in a spatially fixed arrangement, and a control device configured to control the floating sensor and the reference sensors, wherein at least one of the floating sensor and the reference sensors is configured to emit an acoustic signal to the remaining sensors, wherein the remaining sensors are each configured to receive the emitted acoustic signal, and wherein the control device is configured to determine signal travelling times of the acoustic signal from the emitting sensor to the receiving sensor, to compute a spatial position of the floating sensor with reference to the reference sensors from the signal travelling times and to determine the liquid fill level on the basis of the computed spatial position of the floating sensor.

According to a second aspect of the present invention, a method for determining a liquid fill level of a tank, comprises the steps of emitting a first acoustic signal by a floating sensor floating on the surface of a liquid contained in the tank, receiving the first acoustic signal by at least three reference sensors mounted at a hull of the tank in a spatially fixed arrangement, determining the signal travelling times of the first acoustic signal between the floating sensor and each of the reference sensors, computing the spatial position of the floating sensor with reference to the reference sensors from the determined signal travelling times, and determining the liquid fill level on the basis of the computed spatial position of the floating sensor.

One main idea of the present invention is to provide a number of sensors having a fixed position with respect to the tank and exchange acoustic signals with a sensor floating on a liquid surface within the tank. The time needed by the acoustic signals to reach the other sensors may be determined and taken as a basis to compute the spatial position of the floating sensor within the tank by way of triangulation. This allows for the determination of the liquid fill level and concomitantly for the assessment of the amount of liquid contained within the tank.

An advantage of such system is that the system is capable to measure fill levels of liquids which reflect sonic, radar or microwave signals only poorly.

Furthermore, an advantage is that the influence of echoing signals, for example from air bubbles, or reflected signals within the tank do not influence the fill level determination, since only the point in time of reception of the signal travelling the direct path has to be taken into account. Therefore, any potential stray signals may be safely ignored.

Additionally, there is no need to penetrate the hull of the tank to integrate the reference sensors. Moreover, mechanical links for floatation devices within the tank may be avoided as well.

The measurement system is reliable and robust against pollution or obstruction due to solid objects or particles since the amplitude of the signals does not necessarily contribute to the determination of the spatial position of the floating sensor. As long as the signal intensity may be kept at a sufficiently high level to receive the signal at another sensor, the system continues to work reliably.

The dependent claims provide additional technical features of advantageous embodiments and further improvements of the invention.

According to an embodiment of the measurement system, the acoustic signals comprise ultrasonic signals. This has the advantage, that electromagnetic interference for example in an aircraft may be avoided.

According to a further embodiment of the measurement system, the control device is an integral component of the floating sensor.

According to a further embodiment of the measurement system, the control device is an integral component of one of the reference sensors.

According to a further embodiment of the measurement system, the control device is connected to the floating sensor by a cable.

According to a further embodiment of the measurement system, the control device is connected to the floating sensor by means of a wireless communication channel.

According to a further embodiment of the measurement system, the floating sensor is supplied with electrical energy by a battery.

According to a further embodiment of the measurement system, the tank comprises a potable water tank, a waste water tank or a fuel tank of an aircraft or spacecraft. The invention is particularly useful for mobile system in aviation system due to its ability to adapt to varying environmental conditions.

According to a further embodiment of the measurement system, the control device is configured to receive declination parameters of the aircraft or spacecraft and to determine the liquid fill level on the basis of the declination parameters.

According to an embodiment of the method, the method further comprises the steps of emitting a second acoustic signal by a first one of the at least three reference sensors, receiving the second acoustic signal by a second one of the at least three reference sensors, determining the signal travelling time of the second acoustic signal between the first and the second one of the reference sensors, and computing the speed of sound in the tank on the basis of the determined signal travelling time.

According to a further embodiment of the method, the first and second one of the reference sensors are mounted at the hull of the tank substantially above the surface of the liquid, and wherein the computed speed of sound is the speed of sound in the atmosphere above the liquid in the tank.

According to a further embodiment of the method, the first and second one of the reference sensors are mounted at the hull of the tank substantially below the surface of the liquid, and wherein the computed speed of sound is the speed of sound in the liquid in the tank.

According to a further embodiment of the method, the first and/or second acoustic signal comprises a series of pulsed acoustic signals.

According to a further embodiment of the method, the first and/or second acoustic signal comprises a message signal comprising information about the time of emitting and the identity of the emitting sensor.

The invention will be explained in greater detail with reference to exemplary embodiments depicted in the drawings as appended.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Tanks within the meaning of the invention may comprise any partially or completely enclosed receptacles or containers configured to hold a liquid or a liquid-like substance. In particular, tanks within the meaning of the invention may comprise containers, silos, bulk tanks, vessels, reservoirs, basins, canisters, drums or any other repositories suited for containing fluxional material.

Liquids within the meaning of the invention may comprise any fluid or fluid-like substance capable of flowing and thereby taking on the shape of a solid receptacle holding the substance. For example, liquids within the meaning of the invention may comprise water, in particular potable water or waste water, fuel, oil or hydraulic fluids. It may also be possible for liquids to contain further particles or objects as a heterogeneous mixture or an emulsion or suspension. For example, waste water as a liquid may also contain faecal matter, detergents, hygienic tissues or toilet paper.

Figure 1:
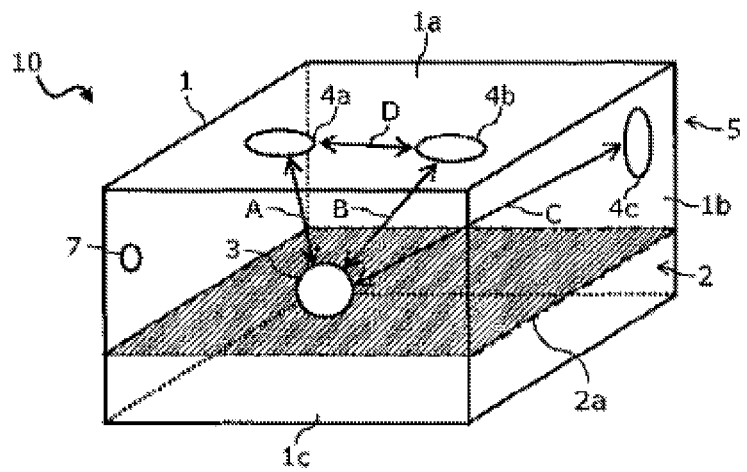
FIG. 1 shows a schematic illustration of a measurement arrangement according to an embodiment of the invention.

FIG. 1 schematically illustrates a measurement arrangement for a measurement system 10 that is able to determine the liquid fill level of a tank 1 at least partially filled with a liquid 2.

The tank 1 may for example be a potable water tank, a waste water tank or a fuel tank of an aircraft or a spacecraft. Although the tank 1 is depicted as parallelepiped-shaped, it may be possible for the tank 1 to have any desired shape, for example cylindrical, conical, frustroconical, spherical, cuboid or any other desired geometrical shape. The tank 1 may for example be manufactured from a metallic material, a plastics material or a carbon-fibre material (CFK).

The tank 1 may have a hull 5 forming a receptacle for holding liquids or liquid-like substances such as the liquid 2. The liquid 2 is capable of flowing and conforming to the boundaries of the tank 1 as defined by the hull 5. Depending on the orientation of the tank 1 with respect to the ground, the liquid 2 may form a surface 2a reaching up to a certain height within the tank 1. The tank 1 may have a top surface 1a, a bottom surface 1c and several side surfaces 1b, the respective arrangement of which depending on the actual shape of the tank 1. The terms "top" and "bottom" have been chosen with regard to the preferred orientation of the tank 1, with the bottom generally being arranged near the ground and below the surface 2a of the liquid 2 and the top generally being arranged far from the ground and above the surface 2a of the liquid 2.

The tank 1 may be provided within an aircraft or spacecraft the position of which with respect to the ground may change, for example during a climb or descent phase, or during a turn. Control devices (not shown) of the aircraft or spacecraft may provide for declination parameters indicative of the actual position of the aircraft or spacecraft—and thus the tank 1—with respect to the ground.

The measurement system 10 may comprise a floating sensor 3 deposited within the tank 1 and configured to float on the surface 2a of the liquid 2. For example, the floating sensor 3 may comprise buoyancy means to guarantee a certain amount of buoyancy relative to the density of the liquid 2 so that the floating sensor 3 will generally stay on top of the surface 2a. For example, the floating sensor 3 may comprise a spherical shell made from silicon, rubber, glass or similar materials providing the desired chemical stability and/or physical durability towards the respective liquid 2.

The floating sensor 3 may be configured to emit a signal, for example an acoustic signal such as an audible sound wave or an ultrasonic signal, a radar signal, a microwave signal or any other electromagnetic signal. The signal may for example be emitted radially without any preferred direction of emission.

The measurement system 10 may comprise at least three reference sensors 4a, 4b, 4c mounted at the hull 5 of the tank 1. The number of the reference sensors 4a, 4b, 4c in FIG. 1 is exemplarily shown as three, however, any other number greater than three may be possible for the number of reference sensors as well. The reference sensors 4a, 4b, 4c may be arranged on the hull surface in a spatially fixed arrangement, i.e. the distances between each two of the reference sensors 4a, 4b, 4c may be fixed. Exemplarily a distance D is shown between the reference sensors 4a and 4b. This distance D may be held constant, for example by fixing the reference sensors 4a and 4b to the hull 5. The reference sensors 4a, 4b, 4c may be fixed to an outer surface of the hull 5, for example by means of glue, bolts, rivets, soldering or welding. The reference sensors 4a, 4b, 4c may also be inserted through bore holes of the hull 5. Alternatively, the reference sensors 4a, 4b, 4c may be fixed to an inner surface of the hull 5.

The reference sensors 4a, 4b, 4c may be attached to the top surface 1a, the bottom surface 1c or one or more of the side surfaces 1c of the hull 5 of the tank 1.

The reference sensors 4a, 4b, 4c may each comprise a certain distance A, B, C to the floating sensor 3 which may be variable with the position of the floating sensor 3 on the surface 2a of the liquid as well as the fill level of the liquid 2 in the tank 1.

Either the floating sensor 3 or at least one of the reference sensors 4a, 4b, 4c, or possibly both the floating sensor 3 and at least one of the reference sensors 4a, 4b, 4c may be configured to emit a signal, for example an acoustic signal, to the remaining sensors. The remaining sensors are each configured to receive the emitted signal. For example, if the floating sensor 3 emits a signal, the reference sensors 4a, 4b, 4c may each receive the signal. The floating sensor 3 may store or output the information of the point in time when the signal has been emitted so that the reference sensors 4a, 4b, 4c may each calculate a respective signal travelling time of the signal from the floating sensor 3 by evaluating the time of reception of the signal with respect to the point in time when the signal has been emitted. The reference sensors 4a, 4b, 4c may in that case only react to the first reception of the signal—echoes or reflected signals reflected on the inside walls of the tank 1 or the surface 2a of the liquid 2 will arrive later and do not need to be taken into account. Thus, only the signal with a direct, i.e. straight travelling path from the floating sensor 3 to the reference sensors 4a, 4b, 4c will be used for evaluation of the signal travelling times.

Figure 2:
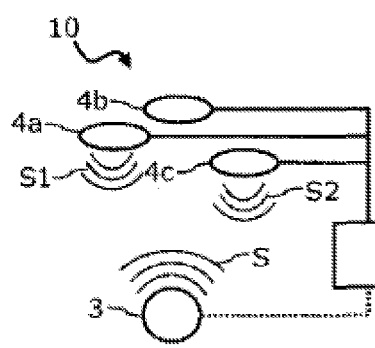
FIG. 2 shows a schematic illustration of a measurement system according to another embodiment of the invention.
Figure 3:
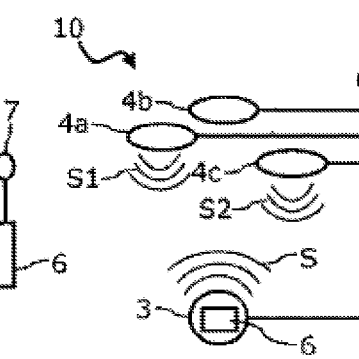
FIG. 3 shows a schematic illustration of a measurement system according to yet another embodiment of the invention.
Figure 4:
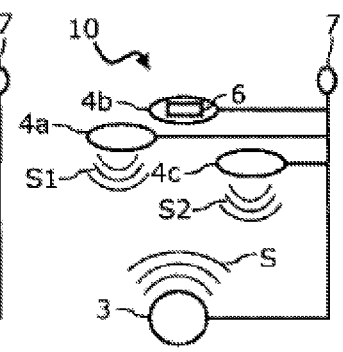
FIG. 4 shows a schematic illustration of a measurement system according to yet another embodiment of the invention.

As shown in FIGS. 2 to 4, the measurement system 10 may comprise a control device 6 configured to control the floating sensor 3 and the reference sensors 4a, 4b, 4c. The control device 6 may be configured to determine the signal travelling times of the signal from the emitting sensor, for example the floating sensor 3, to the receiving sensor, for example one of the reference sensors 4a, 4b, 4c. On the basis of the determined signal travelling times the control device 6 may be configured to compute a spatial position of the floating sensor 3 with reference to the reference sensors 4a, 4b, 4c, for example by triangulation. This spatial position of the floating sensor 3 within the tank 1 may be used to determine the liquid fill level, i.e. the height of the surface 2a of the liquid 2 within the tank 1.

As shown in FIG. 2, the control device 6 may be an external device to both the floating sensor 3 as well as the reference sensors 4a, 4b, 4c. For example, the control device 6 may be included within a control module of an aircraft or spacecraft. The floating sensor 3 may be coupled by a cable or any other wirebound connection to the control device 6. It may also be possible for the floating sensor 3 to be connected to the control device 6 by means of wireless communication. To that end, the floating sensor 3 may comprise an independent electric power supply such as a battery or accumulator. The floating sensor 3 may have a wireless communication module such as an RF module, a GPS module or a WiFi module.

As shown in FIG. 3, the control device 6 may alternatively be an integral component of the floating sensor 3. As shown in FIG. 4, the control device 6 may alternatively be an integral component of one of the reference sensors 4a, 4b, 4c. These solutions provide the advantage of independence of the measurement system 10 from any connection to an external control system. In those cases, the sensor comprising the control device 6 may be a master device coupled to the remaining sensors by wire or by wireless communication, which remaining sensors act as slave devices to the master device.

In any case, the floating sensor 3 may be configured to emit an acoustic signal S to the reference sensors 4a, 4b, 4c. In turn, the reference sensors 4a, 4b, 4c may be configured to emit acoustic signals S1 to the floating sensor 3.

One or more of the reference sensors 4a, 4b, 4c may be configured to emit reference signals S2 to one of the other reference sensors 4a, 4b, 4c. The reference signals S2 may be used to determine the speed of sound within the tank, whether in the atmosphere above the liquid surface 2a or within the liquid 2 itself. If the reference sensors 4a, 4b, 4c exchanging the reference signals S2 are substantially arranged above the expected liquid surface 2a, for example on a top surface 1a of the hull 5 of the tank 1, then the reference signals S2 may be used to determine the speed of sound in the atmosphere above the liquid surface 2a. If, on the other hand, the reference sensors 4a, 4b, 4c exchanging the reference signals S2 are substantially arranged below the expected liquid surface 2a, for example on a bottom surface 1c of the hull 5 of the tank 1, then the reference signals S2 may be used to determine the speed of sound in the liquid 2 itself.

The measurement system 10 may for example also comprise at least three reference sensors arranged above the surface 2a of the liquid 2, i.e. near the top surface 1a, as well as at least three reference sensors arranged below the surface 2a of the liquid 2, i.e. near the bottom surface 1c. This may be particularly advantageous for slim tanks, i.e. having a small cross section of the surface 2a of the liquid 2, since the accuracy of determination of the amount of liquid 2 in the tank 1 may be improved. Especially in aircraft it may be important to determine a very low fill level, for example for a safety deactivation of the connected systems (pumping systems or the like), and a very high fill level, for example for determination of the sufficiency of supply for the various connected systems.

Moreover, the three reference sensors arranged above the surface 2a of the liquid 2 may provide a first computation value for the spatial position of the floating sensor 3 and, the three reference sensors arranged below the surface 2a of the liquid 2 may provide a second computation value for the spatial position of the floating sensor 3, independent of the first computation value. The two computation values may then be used to perform a plausibility check for verifying the determined fill level of the tank 1.

Especially for systems installed in aircraft or spacecraft the change of the density of the atmosphere in the tank 1 may have an impact on the speed of sound and thus on the calculation basis for the signal travelling times of the measuring signals S and S1. A waste tank is for example permanently connected to the ambient air. A potable water tank is regulated to maintain fixed pressure difference between the system pressure and the cabin pressure. Depending on the flying height of the aircraft, both the ambient pressure as well as the cabin pressure may be subject to changes. Therefore, the speed of sound may be determined periodically during the course of a flight in order to keep the value for the speed of sound updated with respect to the flying height of the aircraft or spacecraft.

The control device 6 may then be configured to take into account the determined speed of sound when determining the liquid fill level in the tank 1.

Moreover, the control device 6 may also be configured to receive declination parameters of the aircraft or spacecraft and to determine the liquid fill level on the basis of the declination parameters. In particular, when climbing or descending or when flying a turn, the position of the aircraft and spacecraft, and hence the tank 1, may be skewed with respect to the ground. Therefore, the surface 2a of the liquid 2 may be skewed within the tank 1 as well. The control device 6 may factor in the declination parameters when computing the spatial position of the floating sensor 3.

It may also be possible to include further sensors 7 into the system 10, for example temperature sensors, pressure sensors, hygrometers or similar sensors. The output parameters of those sensors 7 may be used to evaluate or affirm the determined speed of sound in the system. Alternatively, the control device 6 may evaluate the speed of sound in the tank 1 on the basis of the sensor output of the sensors 7 alone.

The speed of sound may also be influenced by the temperature of the liquid 2. For example, when refilling water as liquid 2 in a tank 1, the temperature of the water during filling may not be known a priori. In such a case, the determination of the speed of sound may be continuously performed during filling so that the accuracy of the fill level determination may be improved.

The acoustic signals S and S1 may be sent out periodically. It may be possible for the acoustic signals S and S1 to consist of a series of pulsed signals, for example with constant or continuously increasing amplitude.

Figure 5:
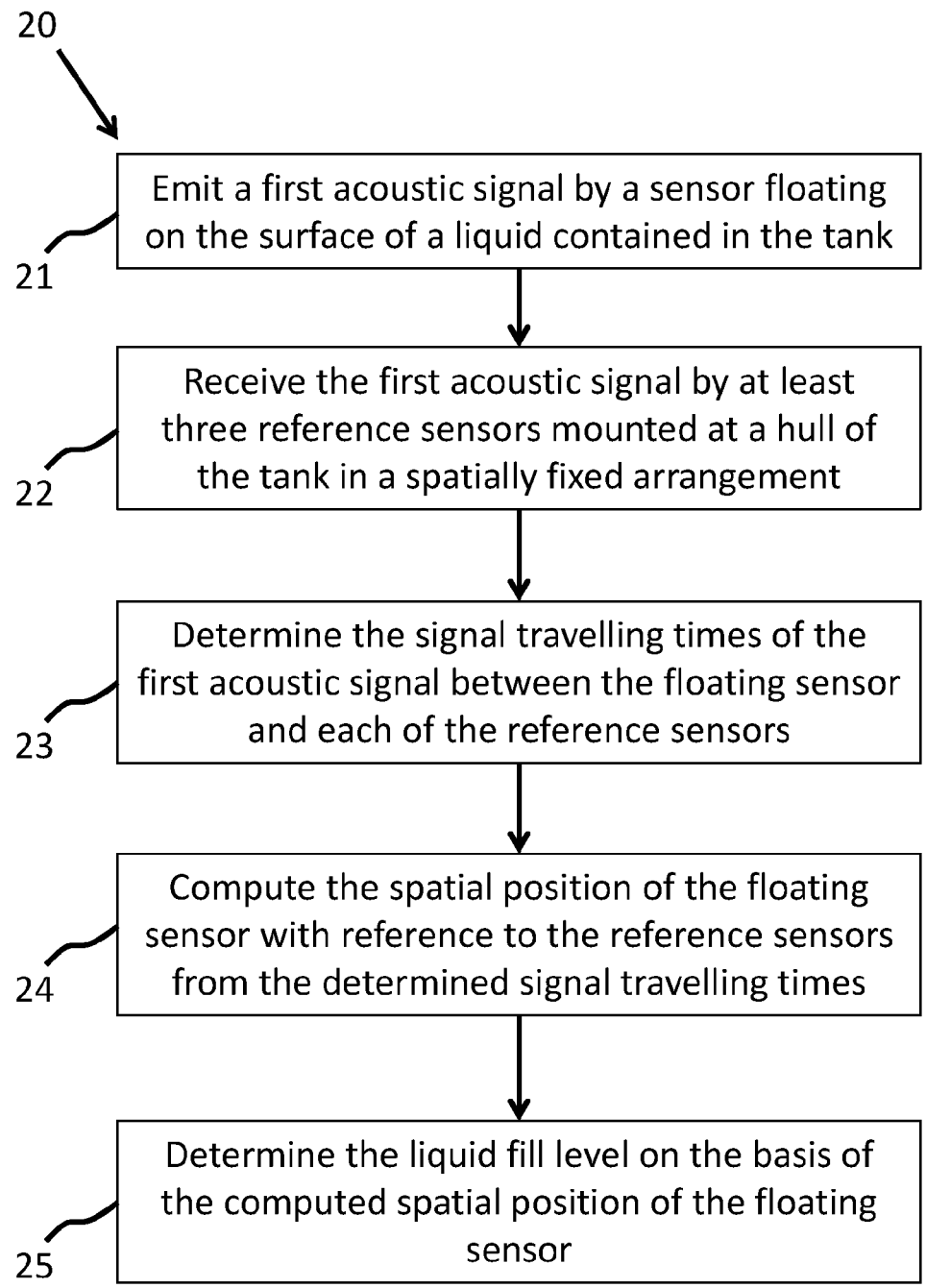
FIG. 5 shows a schematic illustration of a method for determining the liquid fill level of a tank according to yet another embodiment of the invention.

FIG. 5 shows a schematic illustration of a method 20 for determining the fill level of a liquid in a tank, especially of a liquid 2 in a tank 1 as shown in conjunction with FIG. 1. The method 20 may be employed by a measurement system as explained in conjunction with FIGS. 1 to 4.

In a first step 21, a first acoustic signal may be emitted by a floating sensor 3 floating on the surface 2a of a liquid 2 contained in the tank 1. In a second step 22, the first acoustic signal may be received by at least three reference sensors 4a, 4b, 4c mounted at a hull 5 of the tank 1 in a spatially fixed arrangement. In a third step 23, the signal travelling times of the first acoustic signal may be determined between the floating sensor 3 and each of the reference sensors 4a, 4b, 4c. Then, the spatial position of the floating sensor 3 with reference to the reference sensors 4a, 4b, 4c may be computed in a fourth step 24 from the determined signal travelling times. Finally, a fifth step 25 comprises determining the liquid fill level on the basis of the computed spatial position of the floating sensor 3.

Optionally, the method 20 may further comprise the steps of emitting a second acoustic signal by a first one of the at least three reference sensors, receiving the second acoustic signal by a second one of the at least three reference sensors, determining the signal travelling time of the second acoustic signal between the first and the second one of the reference sensors, and computing the speed of sound in the tank on the basis of the determined signal travelling time.

The first and second one of the reference sensors may for example be mounted at the hull of the tank substantially above the surface of the liquid, so that the computed speed of sound is the speed of sound in the atmosphere above the liquid in the tank.

Alternatively, the first and second one of the reference sensors may be mounted at the hull of the tank substantially below the surface of the liquid, so that the computed speed of sound is the speed of sound in the liquid in the tank.

It may be possible for the first and/or second acoustic signal to comprise a message signal comprising information about the time of emitting and the identity of the emitting sensor. Such signals may be implemented similarly to GPS signal containing spatially and temporally resolved signal information from the respective emitting sensor.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively.

What is claimed is:

1. A measurement system for determining a liquid fill level of a tank, comprising:
   a floating sensor configured to float on the surface of a liquid contained in the tank;
   at least three reference sensors mounted at a hull of the tank in a spatially fixed arrangement; and
   a control device configured to control the floating sensor and the reference sensors,
   wherein at least one of the floating sensor and the reference sensors is configured to emit an acoustic signal to the remaining sensors,
   wherein the remaining sensors are each configured to receive the emitted acoustic signal, and
   wherein the control device is configured to determine signal travelling times of the acoustic signal from the emitting sensor to the receiving sensor, to compute a spatial position of the floating sensor with respect to the reference sensors using the signal travelling times of the acoustic signal, to determine the liquid fill level on the basis of the computed spatial position of the floating sensor, to control a first one of the at least three reference sensors to emit a test acoustic signal which is received by a second of the at least three reference sensors, to determine a travelling time of the test acoustic signal between the first and the second one of the at least three reference sensors, and to compute a speed of sound in the tank using the travelling time of the test acoustic signal.

2. The measurement system of claim 1, wherein the acoustic signals comprise ultrasonic signals.

3. The measurement system of claim 1, wherein the control device is an integral component of the floating sensor.

4. The measurement system of claim 1, wherein the control device is an integral component of one of the reference sensors.

5. The measurement system of claim 1, wherein the control device is connected to the floating sensor by a cable.

6. The measurement system of claim 1, wherein the control device is connected to the floating sensor by a wireless communication channel.

7. The measurement system of claim 6, wherein the floating sensor is supplied with electrical energy by a battery.

8. The measurement system of claim 1, wherein the tank comprises a potable water tank, a waste water tank or a fuel tank of an aircraft or spacecraft.

9. The measurement system of claim 8, wherein the control device is configured to receive declination parameters of the aircraft or spacecraft and to determine the liquid fill level on the basis of the declination parameters.

10. A method for determining a liquid fill level of a tank, comprising:

emitting a first acoustic signal by a floating sensor floating on the surface of a liquid contained in the tank;

receiving the first acoustic signal by at least three reference sensors mounted at a hull of the tank in a spatially fixed arrangement;

determining signal travelling times of the first acoustic signal between the floating sensor and each of the reference sensors;

computing the spatial position of the floating sensor with reference to the reference sensors from the determined signal travelling times;

determining the liquid fill level on the basis of the computed spatial position of the floating sensor, emitting a test acoustic signal by a first one of the at least three reference Sensors;

receiving the test acoustic signal by a second one of the at least three reference sensors;

determining a signal travelling time of the test acoustic signal between the first and the second one of the at least three reference sensors; and computing a speed of sound in the tank using the signal travelling time of the test acoustic signal.

11. The method of claim 10, wherein the first and second one of the reference sensors are mounted at the hull of the tank at or above the surface of the liquid, and wherein the computed speed of sound is the speed of sound in the atmosphere above the liquid in the tank.

12. The method of claim 10, wherein the first and second one of the reference sensors are mounted at the hull of the tank below the surface of the liquid, and wherein the computed speed of sound is the speed of sound in the liquid in the tank.

13. The method of claim 10, wherein the first and/or test acoustic signal comprises a series of pulsed acoustic signals.

14. The method of claim 10, wherein the first and/or test acoustic signal comprises a message signal comprising information about the time of emitting and the identity of the emitting sensor.

* * * * *